United States Patent
Huang et al.

(10) Patent No.: US 11,571,720 B2
(45) Date of Patent: Feb. 7, 2023

(54) CARWASH MACHINE

(71) Applicants: ZHUHAI GREE INTELLIGENT EQUIPMENT CO., LTD, Zhuhai (CN); GREE ELECTRIC APPLIANCES, INC. OF ZHUHAI, Zhuhai (CN)

(72) Inventors: Jiafeng Huang, Zhuhai (CN); Huanyan Wang, Zhuhai (CN); Donghe Zhu, Zhuhai (CN)

(73) Assignees: ZHUHAI GREE INTELLIGENT EQUIPMENT CO., LTD, Zhuhai (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 319 days.

(21) Appl. No.: 16/651,772

(22) PCT Filed: Aug. 1, 2018

(86) PCT No.: PCT/CN2018/097968
§ 371 (c)(1),
(2) Date: Mar. 27, 2020

(87) PCT Pub. No.: WO2019/128223
PCT Pub. Date: Jul. 4, 2019

(65) Prior Publication Data
US 2020/0316653 A1 Oct. 8, 2020

(30) Foreign Application Priority Data

Dec. 28, 2017 (CN) .......................... 201711498452.7

(51) Int. Cl.
*B05B 3/02* (2006.01)
*B08B 3/02* (2006.01)
(Continued)

(52) U.S. Cl.
CPC ................ *B08B 3/026* (2013.01); *B05B 1/30* (2013.01); *B05B 9/03* (2013.01); *B05B 1/3013* (2013.01);
(Continued)

(58) Field of Classification Search
CPC ......... B05B 12/0026; B05B 9/01; B05B 1/30; B05B 9/03
(Continued)

(56) References Cited

U.S. PATENT DOCUMENTS 3,633,828 A * 1/1972 Larson ................ B05B 12/0026
239/526
3,637,142 A * 1/1972 Gassaway ............... B05B 9/007
239/394

(Continued)

FOREIGN PATENT DOCUMENTS

CN 101417645 A 4/2009
CN 102371975 A 3/2012
(Continued)

OTHER PUBLICATIONS

Kong, CN 205344846. Google English translated document (Year: 2016).*
(Continued)

*Primary Examiner* — Chee-Chong Lee
(74) *Attorney, Agent, or Firm* — Armstrong Teasdale LLP

(57) ABSTRACT

Provided is a carwash machine. The carwash machine includes: a steam generator and a spray gun connected to the steam generator. The steam generator has a gas outlet used for discharging gas. The spray gun includes a spray gun outer shell and an operating handle. The operating handle is provided on the spray gun outer shell. The steam generator includes: a boiler body, the boiler body having a combustion chamber, and the combustion chamber being in communi-
(Continued)

cation with the gas outlet; an inner cover, the inner cover being sleeved on an outer side of the boiler body, and a gap between the inner cover and the boiler body forming a gas discharge channel used for connecting the combustion chamber and the gas outlet; and an outer cover, the outer cover being sleeved on an outer side of the inner cover. The spray gun also includes: a locking switch.

13 Claims, 7 Drawing Sheets

(51) Int. Cl.
    *B05B 1/30*     (2006.01)
    *B05B 9/03*     (2006.01)
    *B60S 3/04*     (2006.01)
    *B05B 9/01*     (2006.01)
    *B05B 12/00*     (2018.01)

(52) U.S. Cl.
    CPC .............. *B05B 9/01* (2013.01); *B05B 12/0026* (2018.08); *B08B 3/028* (2013.01); *B08B 2230/01* (2013.01); *B60S 3/044* (2013.01)

(58) Field of Classification Search
    USPC .......................................................... 134/105
    See application file for complete search history.

(56) References Cited

U.S. PATENT DOCUMENTS

| | | | | |
|---|---|---|---|---|
| 3,827,635 | A | * | 8/1974 | Krakowski ............... B60S 5/04 239/525 |
| 3,961,754 | A | * | 6/1976 | Kuhns ................... B05B 7/0425 239/311 |
| 4,483,483 | A | * | 11/1984 | Grime ................... B05B 7/2435 251/324 |
| 7,516,910 | B1 | * | 4/2009 | DeWall ............... B05B 12/0026 239/525 |
| 2009/0133728 | A1 | * | 5/2009 | Brillouet et al. ......... B08B 3/00 134/57 R |

FOREIGN PATENT DOCUMENTS

| | | | | |
|---|---|---|---|---|
| CN | 203246444 | U | | 10/2013 |
| CN | 205344846 | U | | 6/2016 |
| CN | 106184135 | A | | 12/2016 |
| CN | 206734271 | U | | 12/2017 |
| CN | 207809342 | U | | 9/2018 |
| JP | 09175341 | A | | 7/1997 |
| KR | WO2004/078542 | | * | 9/2004 ............... B60S 3/00 |

OTHER PUBLICATIONS

International Search Report for corresponding International App. No. PCT/CN2018/097968, dated Nov. 2, 2018, 3 pages.

* cited by examiner

CARWASH MACHINE

CROSS-REFERENCE TO RELATED APPLICATIONS

The present disclosure is a national stage application of International Patent Application No. PCT/CN2018/097968, filed on Aug. 1, 2018, which claims priority to Chinese Patent Application No. 201711498452.7, filed on Dec. 27, 2017, the contents of which are hereby incorporated by reference in their entirety.

TECHNICAL FIELD

The disclosure relates to the field of vehicle maintenance, in particular to a carwash machine.

BACKGROUND

At present, a carwash machine is a machine using a computer to control a brush and high-pressure water to clean cars. The carwash machine is mainly composed of a control system, a circuit, a gas channel, a water channel and a mechanical structure. The carwash machine has the characteristics of simple operation, elegant appearance, and small damage to car paint. In recent years, the carwash machine has been widely used in the automobile service industry.

With the improvement of international energy conservation and environmental protection mechanism and awareness, the traditional way of using high-pressure water to wash car causes massive wastewater pollution and has other disadvantages; steam car washing just solves those problems, and steam car washing will become a new trend of development.

The main concept of steam car washing is that: first of all, the steam can thoroughly clean all parts of the car; and most importantly, steam car washing is not just a process of using high-pressure cold water to wash, but through the drying property of the steam, every small part of the car is thoroughly cleaned, sterilized, disinfected and deodorized at right pressure and temperature, so that a better car washing cleanliness is achieved. To improve simple cleaning to fine cleaning is closely related to the car owner's health.

However, a steam heating efficiency of a steam generator of the carwash machine in the related technology is comparatively low, which is not conducive to a car washing efficiency of the carwash machine.

SUMMARY

Some embodiments of the disclosure mainly aim to provide a carwash machine, to solve a problem that a steam heating efficiency of a steam generator of the carwash machine in the related technology is comparatively low.

To this end, an embodiment of the disclosure provides a carwash machine, which includes a steam generator and a spray gun connected to the steam generator. The spray gun includes a spray gun outer shell and an operating handle. The operating handle is provided on the spray gun outer shell to control the on and off of fluid of the spray gun by pulling the operating handle. The steam generator includes: a boiler body and an inner cover. The inner cover is sleeved on an outer side of the boiler body. A gap between the inner cover and the boiler body forms a gas discharge channel used for discharging gas from the boiler body. The spray gun further includes: a locking switch. The locking switch is adjustably mounted on the spray gun outer shell. The locking switch is positioned on one side of the operating handle and limit cooperats with the operating handle, so as to prevent the operating handle from being pulled when the spray gun is in a non-operating state.

In an exemplary embodiment, the boiler body has a combustion chamber. The steam generator further includes: an igniting component. The igniting component is arranged facing the combustion chamber, to ignite gas entering the combustion chamber.

In an exemplary embodiment, the steam generator further includes: a windproof cover. The windproof cover is arranged on an outer side of the igniting component. A cover chamber of the windproof cover is in communication with the combustion chamber.

In an exemplary embodiment, the steam generator also includes: an outer cover, the outer cover being sleeved on an outer side of the inner cover, and a gap between the inner cover and the outer cover forming a gas intake channel for gas to flow in the combustion chamber; an igniting cover, at least a part of the igniting cover being in the combustion chamber, one end of the igniting cover being in communication with the windproof cover, and the other end of the igniting cover being in communication with the combustion chamber. A gas outlet of the gas intake channel is in communication with a cover chamber of the igniting cover, to be in communication with the combustion chamber through the igniting cover, so that the gas in the gas intake channel is ignited by the igniting component in the windproof cover after entering the igniting cover and enters the combustion chamber to generate a combustion reaction.

In an exemplary embodiment, the spray gun further includes: a sealing component. At least a part of the sealing component is movably arranged in a spray gun main body of the spray gun, to control the on and off of the fluid in the spray gun main body. The operating handle is connected to the sealing component to drive the sealing component to move by pulling the operating handle, so as to control the on and off of the fluid in the spray gun main body. The sealing component includes a cut-off flange used for cutting off a fluid channel in the spray gun main body and an elastic element connected to the cut-off flange. The elastic element is arranged in a retractable way to press the cut-off flange to a position of cutting off the fluid channel of the spray gun main body.

In an exemplary embodiment, the spray gun further includes: a connecting rod. One end of the connecting rod is connected to the sealing component, and the other end of the connecting rod is connected to the operating handle, so that the operating handle drives, through the connecting rod, the sealing component to move.

In an exemplary embodiment, the locking switch has a locking portion. The locking switch is movably arranged along a direction getting close to or away from the operating handle, so that the locking portion is abutted against the operating handle, or the locking portion avoids the operating handle to make the operating handle move.

In an exemplary embodiment, the locking switch has a locking position used for limiting the operating handle and an avoiding position used for avoiding the operating handle. The locking switch is movably arranged between the locking position and the avoiding position. The spray gun further includes a cushion block. The cushion block is mounted on the spray gun outer shell. When the locking switching is at the locking position, the cushion block is on the side, far away from the operating handle, of the locking portion and is abutted against the locking portion, so as to lock the locking switch at the locking position.

In an exemplary embodiment, the spray gun further includes a gas intake pipe and a gas discharge pipe. Both the gas intake pipe and the gas discharge pipe are mounted on the spray gun main body. A gas intake channel used for being in communication with a pipe cavity of the gas intake pipe and a gas discharge channel used for being in communication with a pipe cavity of the gas discharge pipe are arranged on the spray gun main body. At least a part of the sealing component is movably arranged between the gas intake channel and the gas discharge channel, so as to cut off the gas intake channel and the gas discharge channel, or connect the gas intake channel and the gas discharge channel.

In an exemplary embodiment, the carwash machine further includes: an oil tank. The oil tank is connected to an igniting component of the steam generator through an oil conveying pipeline, to supply oil to the igniting component.

In an exemplary embodiment, the carwash machine further includes: a water tank. The water tank is in communication with a water storage chamber of the boiler body of the steam generator through a water conveying pipeline, to supply water to the water storage chamber.

In an exemplary embodiment, the carwash machine further includes: a water replenishing pipeline. One end of the water replenishing pipeline is connected to the water tank, and the other end of the water replenishing pipeline is in communication with the water storage chamber of the steam generator. A water replenishing on-off control valve is provided on the water replenishing pipeline, so, when a water volume in the water storage chamber is less than a predetermined water volume, the water replenishing on-off control valve turns on the water replenishing pipeline to replenish water in the water tank.

In an exemplary embodiment, the carwash machine further includes: a steam pipeline. One end of the steam pipeline is in communication with a liquid storage chamber of the boiler body of the steam generator, and the other end of the steam pipeline is connected to the spray gun, to convey steam in the liquid storage chamber to the spray gun. A steam on-off control valve for controlling the on and off of the steam pipeline is provided on the steam pipeline, and a control valve for controlling the opening and closing of the steam on-off control valve is provided on an outer shell of the carwash machine.

In an exemplary embodiment, the carwash machine further includes: an outer shell and a handrail arranged on the outer shell. The handrail is formed integrally with at least a part of the outer shell.

The steam generator in the disclosure has the gas outlet for discharging gas. The steam generator also includes: the boiler body, the inner cover and the outer cover. The inner cover is sleeved on an outer side of the boil body, and the outer cover is sleeved on an outer side of the inner cover. The boiler body has a combustion chamber. The combustion chamber is in communication with the gas outlet. The gap between the inner cover and the boiler body forms the gas discharge channel for connecting the combustion chamber and the gas outlet, and the gap between the inner cover and the outer cover forms the gas intake channel for gas to flow in the combustion chamber. In this way, air can be blown in the gas intake channel through a blower, then the air flows in the combustion chamber for combustion, and the air after combustion flows out from the gas discharge channel. Because the gas intake channel is at the outer side of the gas discharge channel, at this point, the gas in the gas intake channel may be heated by the gas in the gas discharge channel, thereby improving a steam efficiency of the whole steam generator, and solving the problem that a steam heating efficiency of the steam generator of the carwash machine in the related technology is comparatively low.

BRIEF DESCRIPTION OF THE DRAWINGS

The accompanying drawings constituting a part of the present application are used for providing further understanding of the disclosure. Schematic embodiments of the disclosure and description thereof are used for illustrating the disclosure and not intended to form an improper limit to the disclosure. In the accompanying drawings.

Figure 1:
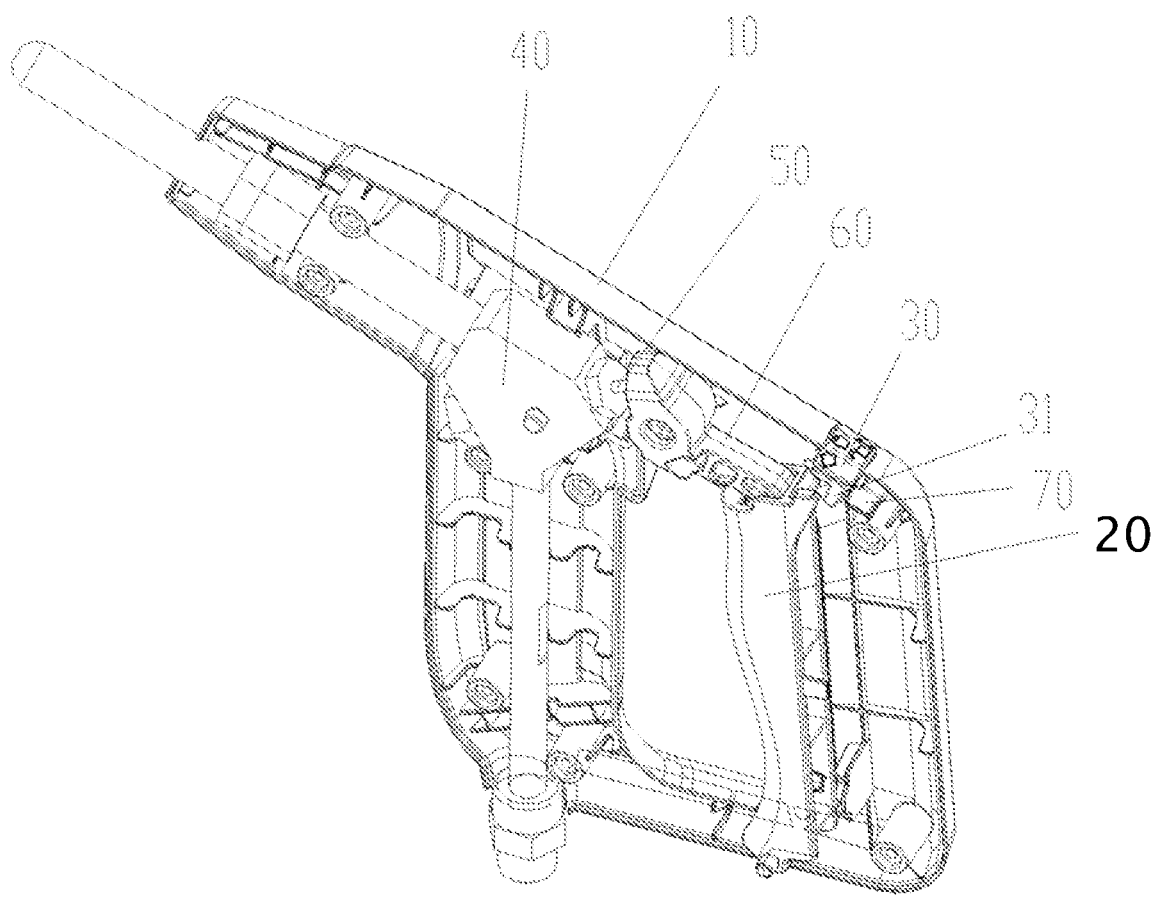
FIG. 1 is a structure diagram of an embodiment of a spray gun of a carwash machine according to the disclosure.

The above accompanying drawings include the following reference numbers.

100. spray gun; 10. spray gun outer shell; 20. operating handle; 30. locking switch; 31. locking portion; 311. pressing part; 40. spray gun main body; 50. sealing component; 51. ejector rod; 60. connecting rod; 70. cushion block;

110. gas intake pipe; 120. gas discharge pipe; 41. gas intake channel; 42. gas discharge channel; 43. cut-off channel; 431. first hole section; 432. second hole section, 140. sealing ejector block; 141. cut-off flange; 150. elastic element; 160. sealing base; 170. first sealing ring; 180. ejector pin; 190. mounting base; 191. second sealing ring; 192. pressing block; 193. ejector block;

200. steam generator; 210. gas outlet; 211. gas inlet; 220. boiler body; 221. combustion chamber; 222. liquid storage chamber; 230. inner cover; 231. gas discharge channel; 232. gas discharge transition channel; 240. outer cover; 241. gas intake channel; 242. gas intake transition channel; 25. igniting component; 260. windproof cover; 270. igniting cover; 280. heat-resistant base; 21. first head cover; 292. second head cover.

310. oil tank; 320. oil conveying pipeline; 330. water tank; 340. water replenishing pipeline; 350. steam pipeline; 360. control valve; 370. outer shell; 380. handrail; 390. controller.

DETAILED DESCRIPTION OF THE EMBODIMENTS

It is to be noted that the embodiments in the present application and the characteristics in the embodiments may be combined under the condition of no conflicts. the disclosure is elaborated below with reference to the accompanying drawings and embodiments.

the disclosure provides a carwash machine. Referring to FIG. 1 to FIG. 7, the carwash machine includes a steam generator 200 and a spray gun 100 connected to the steam generator 200. The steam generator 200 has a gas outlet 210 used for discharging gas. The spray gun 100 includes a spray gun outer shell 10 and an operating handle 20. The operating handle 20 is provided on the spray gun outer shell 10 to control the on and off of fluid of the spray gun by pulling the operating handle 20. The steam generator 200 includes: a boiler body 220, the boiler body 220 having a combustion chamber 221, and the combustion chamber 221 being in communication with the gas outlet 210; an inner cover 230, the inner cover 230 being sleeved on an outer side of the boiler body 220, and a gap between the inner cover 230 and the boiler body 220 forming a gas discharge channel 231 used for connecting the combustion chamber 221 and the gas outlet 210; an outer shell 240, the outer shell 240 being sleeved on an outer side of the inner cover 230, and a gap between the inner cover 230 and the outer cover 240 forming a gas intake channel 241 for gas to flow in the combustion chamber 221. The spray gun 100 further includes: a locking switch 30. The locking switch 30 is adjustably mounted on the spray gun outer shell 10, and the locking switch 30 is positioned on one side of the operating handle 20 and limit cooperates with the operating handle 20.

The steam generator in the disclosure has the gas outlet 210 for discharging gas. The steam generator also includes: the boiler body 220, the inner cover 230 and the outer cover 240. The inner cover 230 is sleeved on an outer side of the boil body 220, and the outer cover 240 is sleeved on an outer side of the inner cover 230. The boiler body 220 has a combustion chamber 221. The combustion chamber 221 is in communication with the gas outlet 210. The gap between the inner cover 230 and the boiler body 220 forms the gas discharge channel 231 for connecting the combustion chamber 221 and the gas outlet 210, and the gap between the inner cover 230 and the outer cover 240 forms the gas intake channel 241 for gas to flow in the combustion chamber 221. In this way, air can be blown in the gas intake channel 241 through a blower, then the air flows in the combustion chamber 221 for combustion, and the air after combustion flows out from the gas discharge channel 231. Because the gas intake channel 241 is at the outer side of the gas discharge channel 231, at this point, the gas in the gas intake channel 241 may be heated by the gas in the gas discharge channel 231, thereby improving a steam efficiency of the whole steam generator, and solving the problem that a steam heating efficiency of the steam generator of the carwash machine in the related technology is comparatively low.

Figure 2:
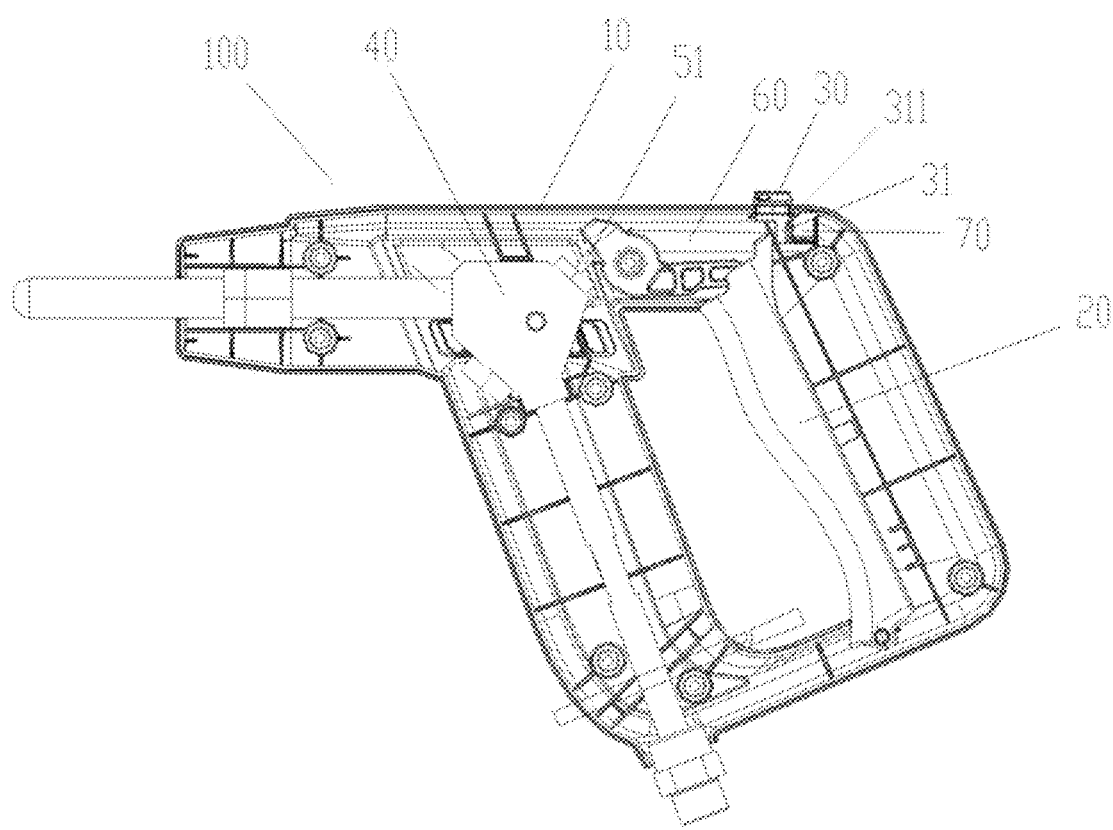
FIG. 2 is a front view of the embodiment of the spray gun of a carwash machine in FIG. 1.
Figure 3:
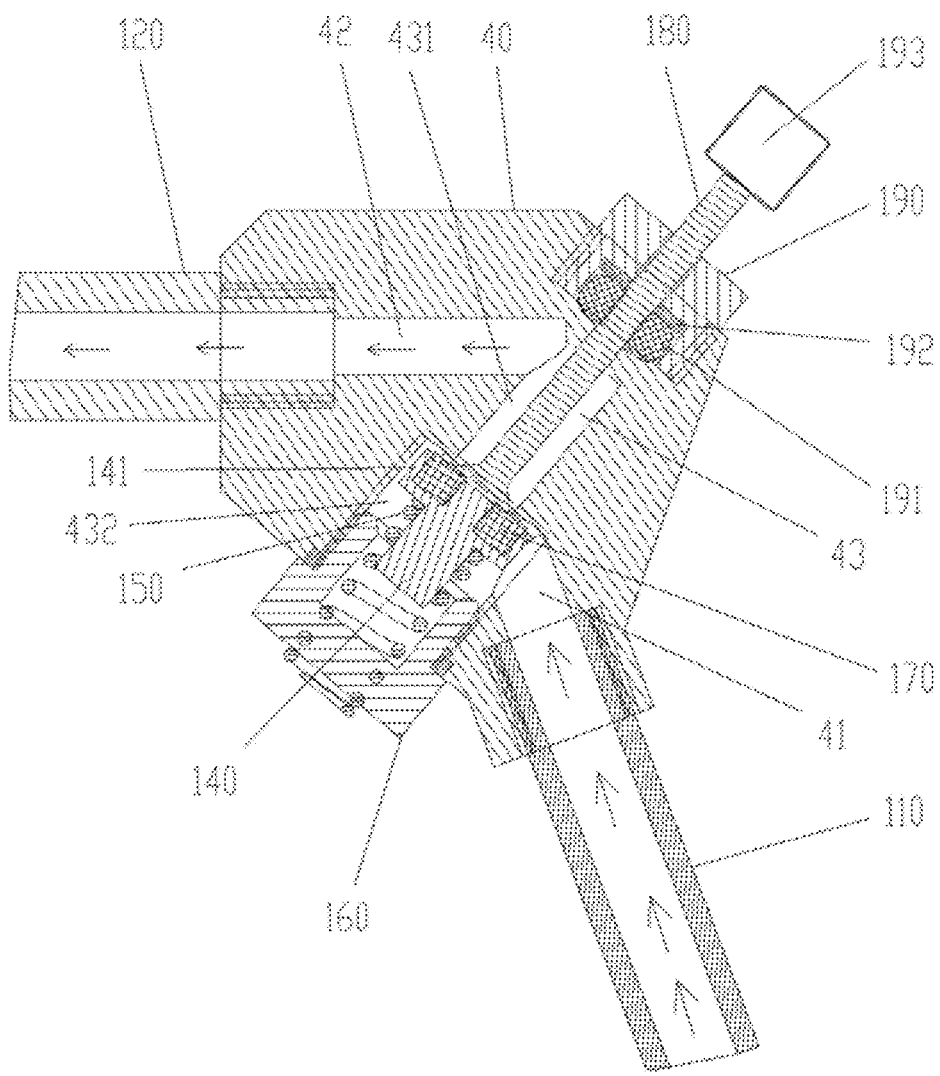
FIG. 3 is an assembly drawing of a sealing component and a spray gun main body of the spray gun of a carwash machine in FIG. 1.

Referring to FIG. 1 to FIG. 3, the operating handle 20 is provided on the spray gun outer shell 10 to control the on and off of the fluid of the spray gun by pulling the operating handle 20. The spray gun further includes: the locking switch 30. The locking switch 30 is adjustably mounted on the spray gun outer shell 10, and the locking switch 30 is positioned on one side of the operating handle 20 and limit cooperates with the operating handle 20, so as to prevent the operating handle 20 from being pulled when the spray gun is in a non-operating state.

The spray gun in the disclosure includes the spray gun outer shell 10, the operating handle 20, and the locking switch 30. The operating handle 20 is provided on the spray gun outer shell 10 to control the on and off of the fluid of the spray gun by pulling the operating handle 20. The locking switch 30 is adjustably mounted on the spray gun outer shell 10, and the locking switch 30 is positioned on one side of the operating handle 20 and limit cooperates with the operating handle 20. In this way, when the spray gun is in the non-operating state, the operating handle 20 is prevented from being pulled, to prevent a user from pulling the operating handle 20 due to faulty operation, thereby preventing the damage of the spray gun to the user, and solving the problem of low safety performance of the spray gun in the related technology.

The spray gun in the disclosure includes a gas intake pipe 110 and a gas discharge pipe 120. Referring to FIG. 3, the spray gun further includes: a spray gun main body 40, both the gas intake pipe 110 and the gas discharge pipe 120 being mounted on the spray gun main body 40; the gas intake channel 41 used for being in communication with a pipe cavity of the gas intake pipe 110 and the gas discharge channel 42 used for being in communication with a pipe cavity of the gas discharge pipe 120 being arranged on the spray gun main body 40; a sealing component, at least a part of the sealing component being between the gas intake channel 41 and the gas discharge channel 42, so as to cut off the gas intake channel 41 and the gas discharge channel 42, or connect the gas intake channel 41 and the gas discharge channel 42. The sealing component includes a cut-off flange 141 used for cutting off the gas intake channel 41 and the gas discharge channel 42 and elastic element 150 connected to the cut-off flange 141. The elastic element 150 is provided in a retractable way to press the cut-off flange 141 to a position of cutting off the gas intake channel 41 and the gas discharge channel 42.

The spray gun in the disclosure includes the gas intake pipe 110, the gas discharge pipe 120 and the spray gun main body 40. Both the gas intake pipe 110 and the gas discharge pipe 120 are mounted on the spray gun main body 40. The gas intake channel 41 used for being in communication with the pipe cavity of the gas intake pipe 110 and the gas discharge channel 42 used for being in communication with the pipe cavity of the gas discharge pipe 120 are arranged on the spray gun main body 40. The spray gun further includes the sealing component. At least a part of the sealing component is movably arranged between the gas intake channel 41 and the gas discharge channel 42, so as to cut off the gas intake channel and the gas discharge channel, or connect the gas intake channel and the gas discharge channel. To turn on or cut off the gas intake channel 41 and the gas discharge channel 42, the sealing component includes the cut-off flange 141 for cutting off the gas intake channel 41 and the gas discharge channel 42 and the elastic element 150 connected to the cut-off flange 141. By arranging the elastic element 150 in a retractable way, the cut-off flange 141 may be pressed, under the action of the elastic element 150, at the position of cutting off the gas intake channel 41 and the gas discharge channel 42, so as to cut off the gas intake channel 41 and the gas discharge channel 42; and when acted upon by an external force, the cut-off flange 141 overcomes the action of the elastic element 150 to turn on the gas intake channel 41 and the gas discharge channel 42, thereby improving a sealing effect of the spray gun main body 40, and solving the problem that the spray gun of the carwash machine in the related technology cannot ensure the sealing effect between its gas discharge channel and gas intake pipe.

The main structure of the spray gun in the present embodiment is as follows. As shown in FIG. 1 and FIG. 2, the spray gun further includes: the spray gun main body 40, the spray gun main body 40 being arranged in the spray gun outer shell 10; and the sealing component 50, at least a part of the sealing component 50 is movably arranged in the spray gun main body 40, to control the on and off of the fluid in the spray gun main body 40. The operating handle 20 is connected to the sealing component 50 to drive the sealing component 50 to move by pulling the operating handle 20, so as to control the on and off of the fluid in the spray gun main body 40.

It can be seen that the on and off of the fluid in the spray gun main body 40 may be controlled conveniently by pulling the operating handle 20, and then the opening or closing of the spray gun is controlled conveniently.

To implement the connection between the operating handle 20 and the sealing component 50, as shown in FIG. 1 and FIG. 2, the spray gun further includes: a connecting rod 60. One end of the connecting rod 60 is connected to the sealing component 50, and the other end of the connecting rod 60 is connected to the operating handle 20, so that the operating handle 20 drives, through the connecting rod 60, the sealing component 50 to move.

The specific form of the sealing component 50 in the present embodiment is as follows: the sealing component 50 includes an ejector rod 51 and a sealing portion connected to the ejector rod 51; the sealing portion is provided in the fluid channel of the spray gun main body 40 to control the on and off of the fluid channel; and the connecting rod 60 is connected to the ejector rod 51 to drive the ejector rod 51 to move. In this way, by making the ejector rod 51 to move, the on and off of the fluid in the spray gun main body 40 may be controlled conveniently.

In the present embodiment, the locking switch 30 is at the side, far away from the sealing component 50, of the operating handle 20. In this way, the operating handle 20 may be locked conveniently, to prevent the operating handle 20 from moving when the spray gun is in the non-operating state.

To lock the operating handle 20, as shown in FIG. 1 and FIG. 2, the locking switch 30 has a locking portion 31; the locking switch 30 is movably arranged along a direction getting close to or away from the operating handle 20, so that the locking portion 31 is abutted against the operating handle 20, or the locking portion 31 avoids the operating handle 20 to make the operating handle 20 move.

Specifically, the locking switch 30 has a locking position used for limiting the operating handle 20 and an avoiding position used for avoiding the operating handle 20. The locking switch 30 is movably arranged between the locking position and the avoiding position. The spray gun further includes a cushion block 70. The cushion block 70 is mounted on the spray gun outer shell 10. When the locking switching 30 is at the locking position, the cushion block 70 is on the side, far away from the operating handle 20, of the locking portion 31 and is abutted against the locking portion 31, so as to lock the locking switch 30 at the locking position.

To limit the locking switch 30, as shown in FIG. 1 and FIG. 2, the cushion block 70 is between the locking position and the avoiding position of the locking switch 30. The cushion block 70 is the elastic element, so that the locking switch 30 compresses the cushion block 70 to pass through the cushion block 70 when moving between the locking position and the avoiding position of the locking switch 30.

Preferably, the cushion block 70 is a rubber block.

To compress the cushion block 70 to move to the avoiding position after passing through the cushion block 70, a pressing part 311 is provided on the locking portion 31. When the locking switch 30 is at the locking position, the pressing part 311 is pressed on the cushion block 70; when the locking switch 30 moves towards the avoiding position, the pressing part 311 compresses to shrink the cushion block 70.

Preferably, an operating head is provided on the locking switch 30.

The main structure of the spray gun main body 40 is as follows.

To turn on or cut off the gas intake channel 41 and the gas discharge channel 42, as shown in FIG. 3, a cut-off channel 43 is provided on the spray gun main body 40. The cut-off channel 43 is between the gas intake channel 41 and the gas discharge channel 42. The cut-off channel 43 is in communication with the gas intake channel 41 and the gas discharge channel 42. The cut-off flange 141 is adjustably arranged in the cut-off channel 43 to cut off the gas intake channel 41 and the gas discharge channel 42.

As shown in FIG. 3, the specific structure of the cut-off channel 43 in the disclosure is that: the cut-off channel 43 is a stepped hole consisting of a first hole section 431 and a second hole section 432; the first hole section 431 is in communication with the gas discharge channel 42; the second hole section 432 is in communication with the gas intake channel 41; and the cut-off channel 43 is shielded at a joint of the first hole section 431 and the second hole section 432.

To fix the whole sealing component, the sealing component further includes a sealing base 160. One end of the elastic element 150 is abutted against the sealing base 160, and the other end of the elastic element 150 is abutted against the cut-off flange 141. Preferably, the sealing base 160 is a sealing nut.

To facilitate the sealing of the cut-off channel, as shown in FIG. 3, the sealing component further includes a sealing ejector block 140. The cut-off flange 141 is provided on the sealing ejector block 140, and the elastic element 150 is sleeved on the sealing ejector block 140.

Preferably, the elastic element 150 is a spring. The sealing ejector block 140 has a rod body, and the spring is sleeved on the rod body.

In the present embodiment, the sealing component further includes a first sealing ring 170. The first sealing ring 170 is mounted on the cut-off flange 141, so as to enhance a cut-off effect between the gas discharge channel 42 and the gas intake channel 41. By arranging the first sealing ring 170, the sealing effect of the sealing component may be enhanced, thereby ensuring the cut-off effect between the gas discharge channel 42 and the gas intake channel 41.

To push the cut-off flange 141 to connect the gas discharge channel 42 and the gas intake channel 41, as shown in FIG. 3, the spray gun further includes an ejector pin 180. The ejector pin 180 is connected to the cut-off flange 141, so that the cut-off flange 141 is pushed by the ejector pin 180 to move.

To locate the ejector pin 180, as shown in FIG. 3, the spray gun further includes a mounting base 190. The mounting base 190 is sleeved on the ejector pin 180 and connected to the spray gun main body 40, so that the ejector pin 180 is mounted on the spray gun main body 40 through the mounting base 190.

Preferably, the ejector pin 180 and the mounting base 190 are in threaded connection, so that the ejector pin 180 extends or retracts towards the cut-off flange 141 by rotating, to drive the cut-off flange 141 to extend or retract, and then the gas discharge channel 42 and the gas intake channel 41 are turned on.

To achieve the sealing effect between the spray gun main body 40 and the mounting base 190 and the ejector pin 180, as shown in FIG. 3, a mounting chamber is provided on the mount base 190, a second sealing ring 191 is provided in the mounting chamber, and the mounting base 190 is in sealed connection with the spray gun main body 40 through the second sealing ring 191.

In the present embodiment, the spray gun further includes a pressing block 192. The pressing block 192 is provided in the mounting chamber and pressed on the second sealing ring 191. In this way, the sealing effect may be enhanced.

In the present embodiment, an ejector block 193 is provided on one end, far away from the cut-off flange 141, of the ejector pin 180. By arranging the ejector block 193, the ejector pin 180 may be operated conveniently.

Figure 4:
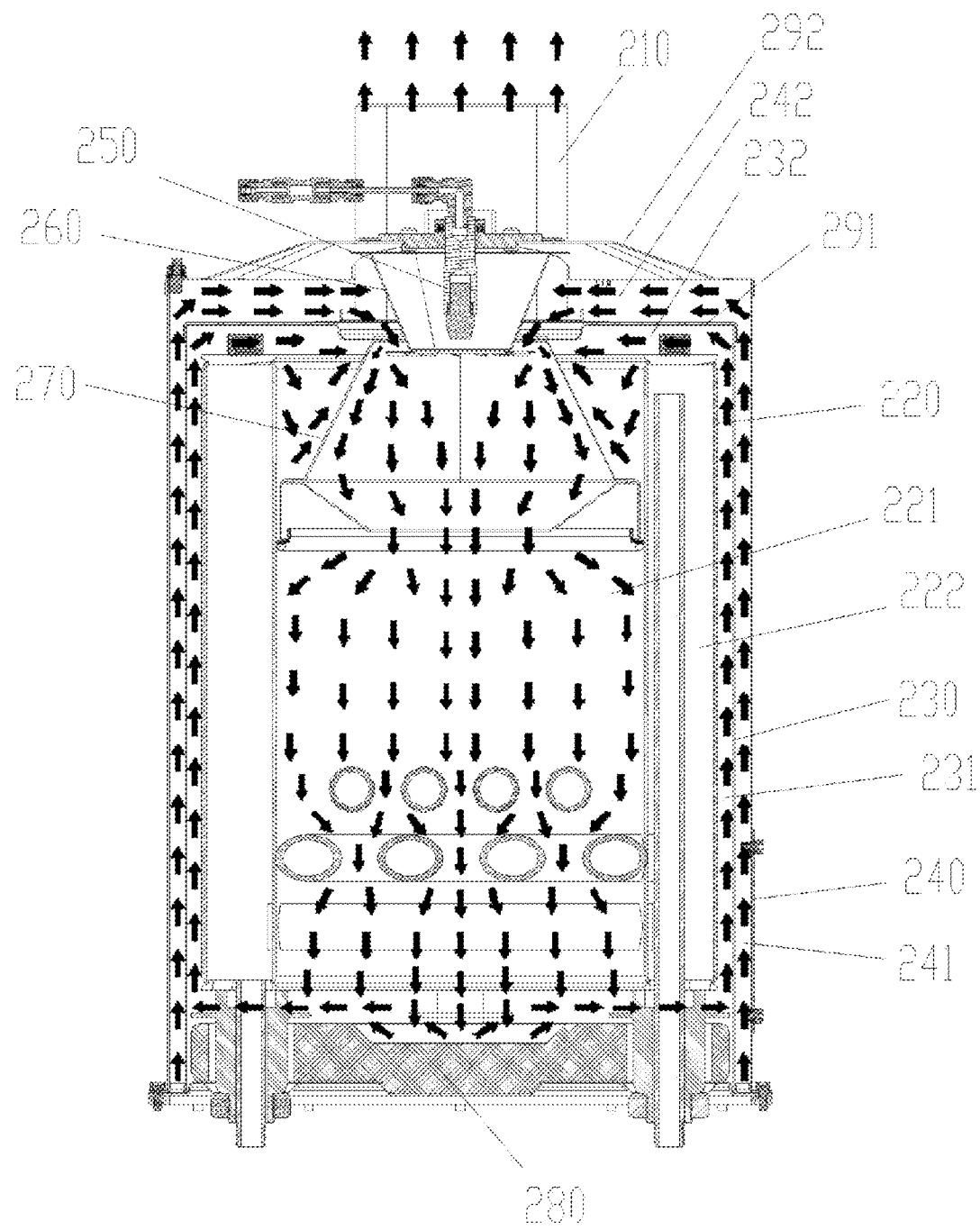
FIG. 4 is a working principle diagram of an embodiment of a steam generator of a carwash machine according to the disclosure.

For the convenience of feeding the gas in the gas intake channel 241 into the gas intake channel 241, as shown in FIG. 4, the gas inlet of the gas intake channel 241 is at the bottom of the outer cover 240, and the gas outlet of the gas intake channel 241 is at the top of the outer cover 240, so that the blower feeds air to the top of the outer cover 240 through the gas inlet of the gas intake channel 241.

Preferably, the gas inlet 211 for being in communication with the gas intake channel 241 is provided on the outer cover 240.

For the convenience of making the gas in the gas discharge channel 231 heat the gas in the gas intake channel 241, the gas inlet of the gas discharge channel 231 is at the bottom of the inner cover 230, the gas outlet of the gas discharge channel 231 is at the top of the inner cover 230, and the gas outlet 210 is at the top of the steam generator and is in communication with the gas outlet of the gas discharge channel 231, so that the gas in the combustion chamber 221 flows from the bottom of the boiler body 220 to the top of the boiler body 220.

As shown in FIG. 4, the gas in the gas intake channel 241 and the gas discharge channel 231 rise from the bottom of the boiler body 220, then, the gas in the gas intake channel 241 may be heated by making full use of the gas in the gas discharge channel 231.

In the present embodiment, the steam generator further includes: an igniting component 250. The igniting component 250 is provided facing the combustion chamber 221, to ignite the gas entering the combustion chamber 221. By arranging the igniting component 250, the gas entering the combustion chamber 221 may be ignited conveniently to burn.

Figure 5:
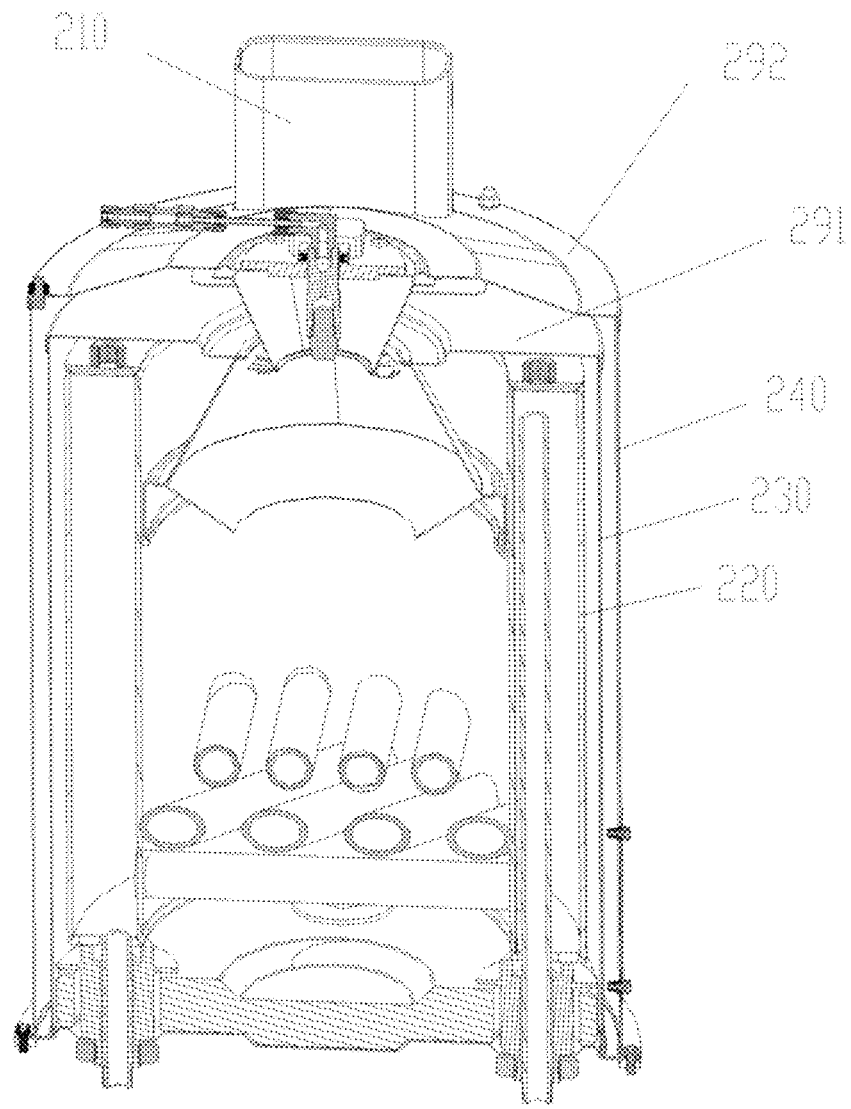
FIG. 5 is a section view of the steam generator of a carwash machine in FIG. 4.

For the convenience of igniting, as shown in FIG. 4 and FIG. 5, the steam generator further includes: a windproof cover 260. The windproof cover 260 is provided on the outer side of the igniting component 250. A cover chamber of the windproof cover 260 is in communication with the combustion chamber 221.

For the convenience of igniting the air, as shown in FIG. 4 and FIG. 5, the steam generator also includes: an igniting cover 270. At least a part of the igniting cover 270 is in the combustion chamber 221. One end of the igniting cover 270 is in communication with the windproof cover 260, and the other end of the igniting cover 270 is in communication with the combustion chamber 221. The gas outlet of the gas intake channel 241 is in communication with a cover chamber of the igniting cover 270, to be in communication with the combustion chamber 221 through the igniting cover 270, so that the gas in the gas intake channel 241 is ignited by the igniting component in the windproof cover 260 after entering the igniting cover 270 and enters the combustion chamber 221 to generate a combustion reaction.

In the present embodiment, a liquid storage chamber 222 for accommodating fluid is provided on the boiler wall of the boiler body 220. The liquid storage chamber 222 is provided around the combustion chamber 221. By arranging the liquid storage chamber 222, water may be stored in the liquid storage chamber 222 to prevent the steam generator from heating in dry.

To protect and support the boiler body 220, as shown in FIG. 4 and FIG. 5, the steam generator further includes a heat-resistant base 280. The heat-resistant base 280 is provided at the bottom of the boiler body 220. Preferably, the heat-resistant base 280 is made of a heat-resistant material.

Figure 6:
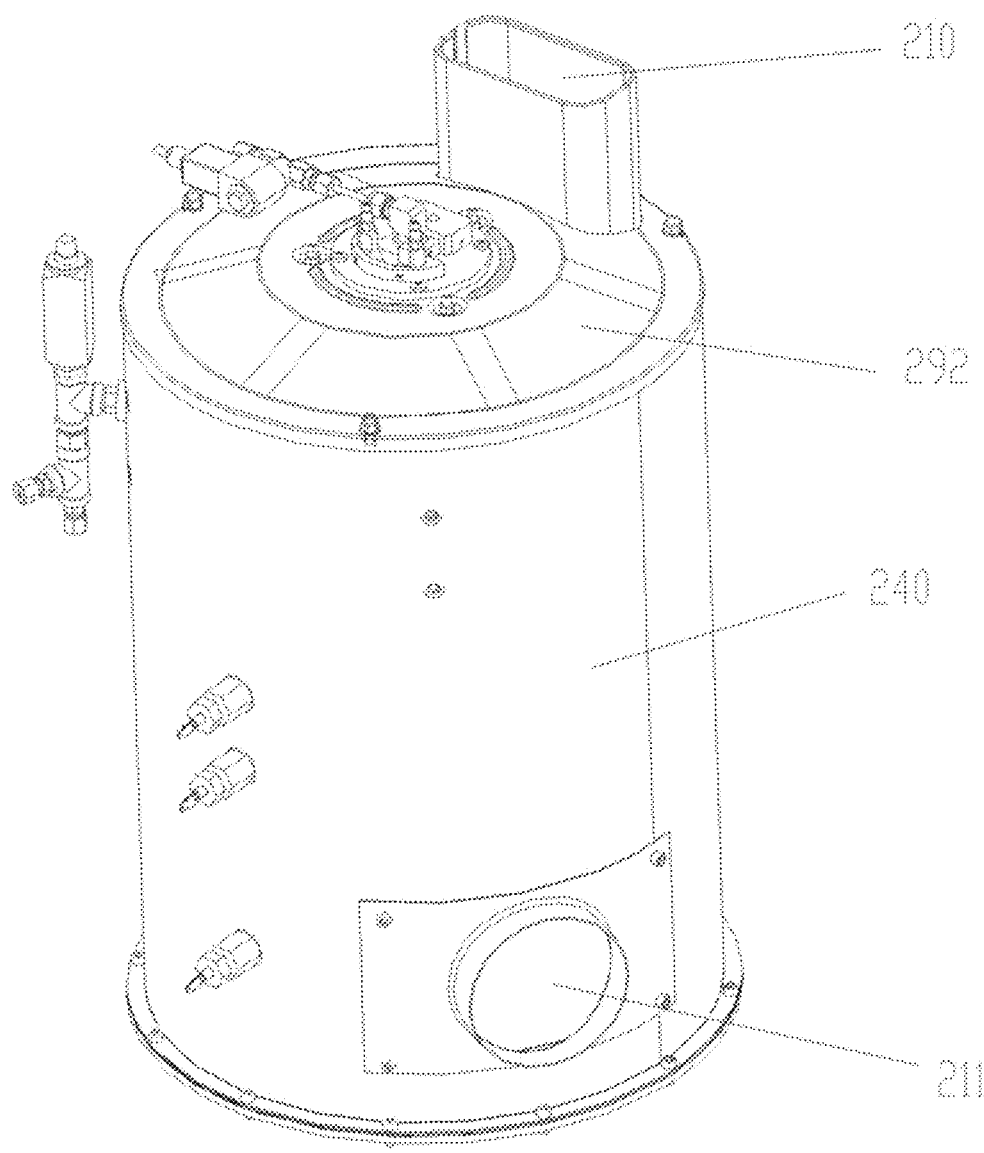
FIG. 6 is an overall structure diagram of the steam generator of a carwash machine in FIG. 4.

In the present embodiment, as shown in FIG. 4 to FIG. 6, the steam generator further includes: a first head cover 291 and a second head cover 292. The first head cover 291 is covered over the upper side of the boiler body 220. The first head cover 291 is connected to the inner cover 230. A gap between the first head cover 291 and the top end of the boiler body 220 forms a gas discharge transition channel 232 for connecting the gas outlet 210 and the gas discharge channel 231. The second head cover 292 is covered over the upper side of the first head cover 291. The second head cover 292 is connected to the outer cover 240. A gap between the second head cover 292 and the top end of the first head cover 291 forms a gas intake transition channel for connecting the gas intake channel 241 and the combustion chamber 221. By forming the gas discharge transition channel 232, the gas outlet 210 may be in communication with the gas discharge channel 231 conveniently. By forming the gas intake transition channel 242, the gas intake channel 241 may be in communication with the combustion chamber 221 conveniently.

In the present embodiment, the carwash machine further includes: an oil tank 310. The oil tank 310 is connected to the igniting component 250 of the steam generator 200 through an oil conveying pipeline 320, to supply oil to the igniting component 250.

In the present embodiment, the carwash machine further includes: a water tank 330. The water tank 330 is in communication with a water storage chamber of the boiler body 220 of the steam generator 200 through a water conveying pipeline, to supply water to the water storage chamber.

In the present embodiment, the carwash machine further includes: a water replenishing pipeline 340. One end of the water replenishing pipeline 340 is connected to the water tank 330, and the other end of the water replenishing pipeline 340 is in communication with the water storage chamber of the steam generator 200. A water replenishing on-off control valve is provided on the water replenishing pipeline 340, so, when a water volume in the water storage chamber is less than a predetermined water volume, the water replenishing on-off control valve turns on the water replenishing pipeline 340 to replenish water in the water tank 330.

In the present embodiment, the carwash machine further includes: a steam pipeline 350. One end of the steam pipeline 350 is in communication with the liquid storage chamber of the boiler body 220 of the steam generator 200, and the other end of the steam pipeline 350 is connected to the spray gun 100, to convey steam in the liquid storage chamber to the spray gun 100. A steam on-off control valve for controlling the on and off of the steam pipeline 350 is provided on the steam pipeline 350, and a control valve 360 for controlling the opening and closing of the steam on-off control valve is provided on an outer shell of the carwash machine.

In the present embodiment, the carwash machine further includes: an outer shell 370 and a handrail 380 arranged on the outer shell 370. The handrail 380 is formed integrally with at least a part of the outer shell 370.

Figure 7:
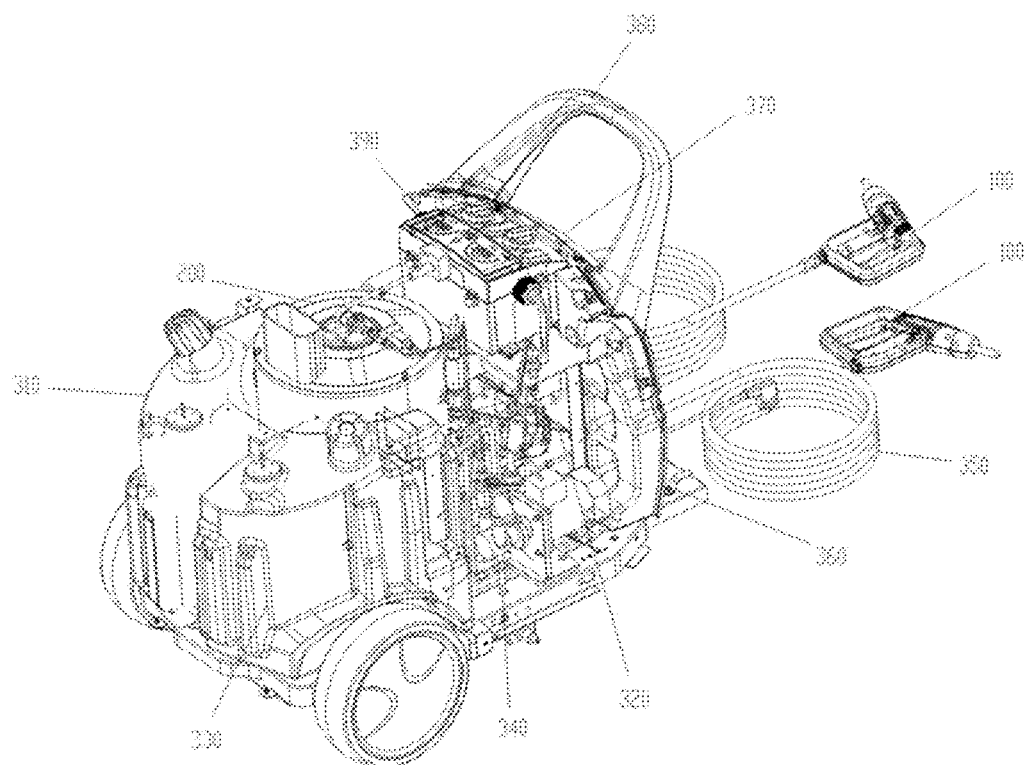
FIG. 7 is an overall structure diagram of a carwash machine according to the disclosure.

The carwash machine further includes a controller 390. The starting and stopping of the carwash machine is controlled by the controller 390.

the disclosure also provides a carwash machine. As shown in FIG. 7, the carwash machine includes a spray gun and a steam generator connected to the spray gun. The steam generator is the one abovementioned.

For the carwash machine in the disclosure, air may be blown in an air inlet duct by the blower, and the outer side of the steam generator is separated by the outer cover and the inner cover to form a circulating air duct system. The air is heated after passing through an igniting device at the top. The circulating air duct system solves the high temperature radiation in the stem generator; meanwhile, the outer wall of the stem generator is heated by using exhaust heat, so the overall steam heating efficiency is improved.

The above is only the preferred embodiments of the disclosure and not intended to limit the disclosure; for those skilled in the art, the disclosure may have various modifications and changes. Any modifications, equivalent replacements, improvements and the like within the spirit and principle of the disclosure should fall within the protection scope of the claims of the disclosure.

What is claimed:

1. A carwash machine, comprising: a steam generator (200) and a spray gun (100) connected to the steam generator (200); the spray gun (100) comprises a spray gun outer shell (10) and an operating handle (20); the operating handle (20) is provided on the spray gun outer shell (10) to control the on and off of fluid of the spray gun by pulling the operating handle (20); wherein, the steam generator (200) comprises:
a boiler body (220);
an inner cover (230), the inner cover (230) being provided on an outer side of the boiler body (220), and a gap between the inner cover (230) and the boiler body (220) forming a gas discharge channel (231) used for discharging gas from the boiler body (220);
the spray gun (100) further comprises:
a locking switch (30), the locking switch (30) being adjustably mounted on the spray gun outer shell (10), and the locking switch (30) being positioned on one side of the operating handle (20) and limit cooperating with the operating handle (20), so as to prevent the operating handle (20) from being pulled when the spray gun (100) is in a non-operating state;
a sealing component (50), at least a part of the sealing component (50) being movably arranged in a spray gun main body (40) of the spray gun, to control the on and off of the fluid in the spray gun main body (40); the operating handle (20) is connected to the sealing component (50) to drive the sealing component (50) to move by pulling the operating handle (20), so as to control the on and off of the fluid in the spray gun main body (40), wherein, the sealing component (50) comprises a cut-off flange (141) used for cutting off a fluid channel in the spray gun main body (40) and an elastic element (150) connected to the cut-off flange (141), the elastic element (150) being arranged in a retractable way to press the cut-off flange (141) to a position of cutting off the fluid channel of the spray gun main body (40);
an ejector pin (180), the ejector pin (180) is connected to the cut-off flange (141);
a mounting base (190), the mounting base (190) is provided around the ejector pin (180) and connected to the spray gun main body (40), so that the ejector pin (180) is mounted on the spray gun main body (40) through the mounting base (190), a mounting chamber is provided on the mount base (190), a second sealing ring (191) is provided in the mounting chamber, and the mounting base (190) is in sealed connection with the spray gun main body (40) through the second sealing ring (191);
a pressing block (192), the pressing block (192) is provided in the mounting chamber and pressed on the second sealing ring (191),
an ejector block (193), the ejector block (193) is provided on one end, opposite from the cut-off flange (141), of the ejector pin (180).

2. The carwash machine as claimed in claim 1, wherein the boiler body (220) has a combustion chamber (221); the steam generator (200) further comprises:
an igniting component (250), the igniting component (250) being arranged facing the combustion chamber (221), to ignite gas entering the combustion chamber (221).

3. The carwash machine as claimed in claim 2, wherein the steam generator (200) further comprises:
a windproof cover (260), the windproof cover (260) being arranged on an outer side of the igniting component (250), and a cover chamber of the windproof cover (260) is in communication with the combustion chamber (221).

4. The carwash machine as claimed in claim 3, wherein the steam generator (200) further comprises:
an outer cover (240), the outer cover (240) being provided on an outer side of the inner cover (230), and a gap between the inner cover (230) and the outer cover (240) forming a gas intake channel (241) for gas to flow in the combustion chamber (221);
an igniting cover (270), at least a part of the igniting cover (270) being in the combustion chamber (221), one end of the igniting cover (270) being in communication with the windproof cover (260), and the other end of the igniting cover (270) being in communication with the combustion chamber (221);
wherein, a gas outlet of the gas intake channel (241) is in communication with a cover chamber of the igniting cover (270), to be in communication with the combustion chamber (221) through the igniting cover (270), so that the gas in the gas intake channel (241) is ignited by the igniting component in the windproof cover (260) after entering the igniting cover (270) and enters the combustion chamber (221) to generate a combustion reaction.

5. The carwash machine as claimed in claim 1, wherein the spray gun (100) further comprises:
a connecting rod (60), one end of the connecting rod (60) being connected to the sealing component (50), and the other end of the connecting rod (60) being connected to the operating handle (20), so that the operating handle (20) drives, through the connecting rod (60), the sealing component (50) to move.

6. The carwash machine as claimed in claim 1, wherein the locking switch (30) has a locking portion (31); the locking switch (30) is movably arranged along a direction getting close to or away from the operating handle (20), so that the locking portion (31) is abutted against the operating handle (20), or the locking portion (31) avoids the operating handle (20) to make the operating handle (20) move.

7. The carwash machine as claimed in claim 6, wherein the locking switch (30) has a locking position used for limiting the operating handle (20) and an avoiding position used for avoiding the operating handle (20); the locking switch (30) is movably arranged between the locking position and the avoiding position; the spray gun further comprises a cushion block (70), the cushion block (70) being mounted on the spray gun outer shell (10); when the locking switching (30) is at the locking position, the cushion block (70) is on the side, opposite from the operating handle (20), of the locking portion (31), and the cushion block (70) is abutted against the locking portion (31), so as to lock the locking switch (30) at the locking position.

8. The carwash machine as claimed in claim 1, wherein the spray gun further comprises a gas intake pipe (110) and a gas discharge pipe (120); both the gas intake pipe (110) and the gas discharge pipe (120) are mounted on the spray gun main body (40); a gas intake channel (41) used for being in communication with a pipe cavity of the gas intake pipe (110) and a gas discharge channel (42) used for being in communication with a pipe cavity of the gas discharge pipe (120) are arranged on the spray gun main body (40); wherein, at least a part of the sealing component is movably arranged between the gas intake channel (41) and the gas discharge channel (42), so as to cut off the gas intake channel (41) and the gas discharge channel (42), or connect the gas intake channel (41) and the gas discharge channel (42).

9. The carwash machine as claimed in claim 1, further comprising: an oil tank (310), the oil tank (310) being connected to an igniting component (250) of the steam generator (200) through an oil conveying pipeline (320), to supply oil to the igniting component (250).

10. The carwash machine as claimed in claim 1, further comprising:
a water tank (330), the water tank (330) being in communication with a water storage chamber of the boiler body (220) of the steam generator (200) through a water replenishing pipeline (340), to supply water to the water storage chamber.

11. The carwash machine as claimed in claim 10, wherein one end of the water replenishing pipeline (340) is connected to the water tank (330), and the other end of the water replenishing pipeline (340) is in communication with the water storage chamber of the steam generator (200); a water replenishing on-off control valve is provided on the water replenishing pipeline (340), so, when a water volume in the water storage chamber is less than a predetermined water volume, the water replenishing on-off control valve turns on the water replenishing pipeline (340) to replenish water in the water tank (330).

12. The carwash machine as claimed in claim 1, further comprising:
a steam pipeline (350), one end of the steam pipeline (350) being in communication with a liquid storage chamber of the boiler body (220) of the steam generator (200), and the other end of the steam pipeline (350) being connected to the spray gun (100), to convey steam in the liquid storage chamber to the spray gun (100);
wherein, a steam on-off control valve (360) for controlling the on and off of the steam pipeline (350) is provided on the steam pipeline (350), and the control valve (360) is provided on an outer shell of the carwash machine.

13. The carwash machine as claimed in claim 1, further comprising: an outer shell (370) and a handrail (380) arranged on the outer shell (370), the handrail (380) is formed integrally with at least a part of the outer shell (370).

* * * * *